Dec. 22, 1936.  P. W. LAMSON  2,065,380
MACHINE FOR CUTTING SHEETS OF RUBBER, LINOLEUM AND THE LIKE
Filed Jan. 7, 1936  5 Sheets-Sheet 1
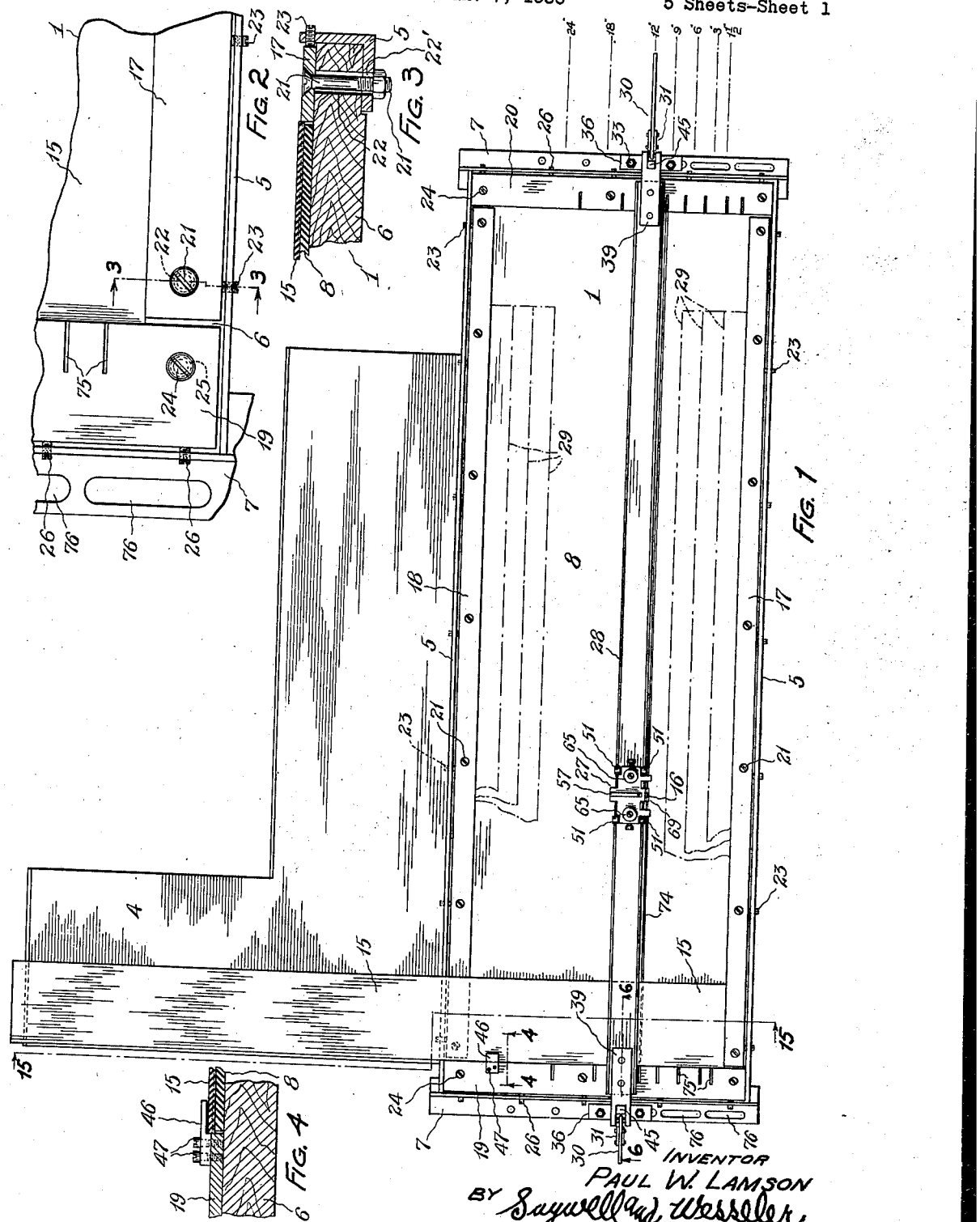
INVENTOR
PAUL W. LAMSON
BY Saywell and Wessler
ATTORNEYS Dec. 22, 1936.  P. W. LAMSON  2,065,380
MACHINE FOR CUTTING SHEETS OF RUBBER, LINOLEUM AND THE LIKE
Filed Jan. 7, 1936   5 Sheets-Sheet 2
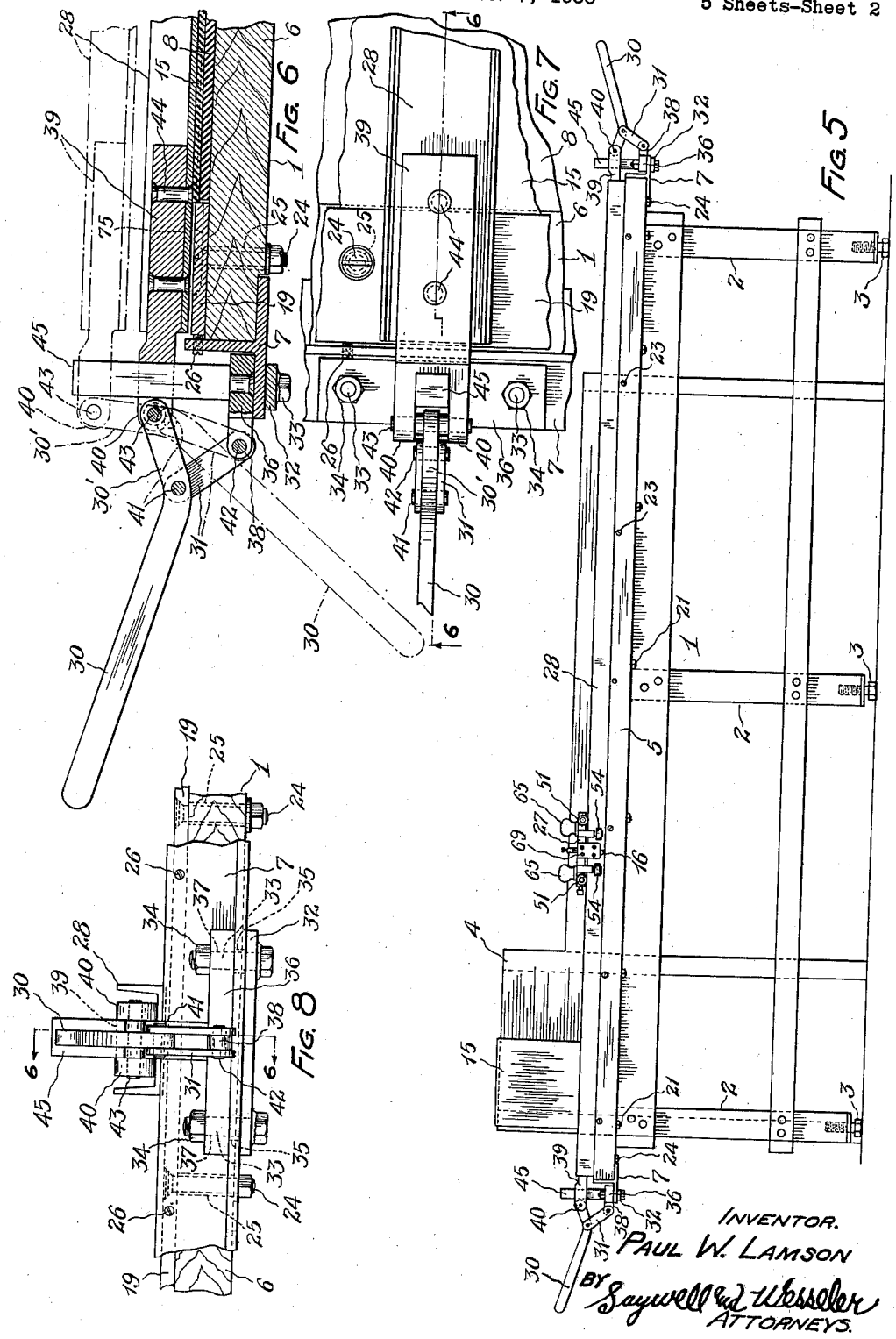
INVENTOR.
PAUL W. LAMSON
BY Saywell and Wesseler
ATTORNEYS.

Dec. 22, 1936. P. W. LAMSON 2,065,380
MACHINE FOR CUTTING SHEETS OF RUBBER, LINOLEUM AND THE LIKE
Filed Jan. 7, 1936 5 Sheets-Sheet 3
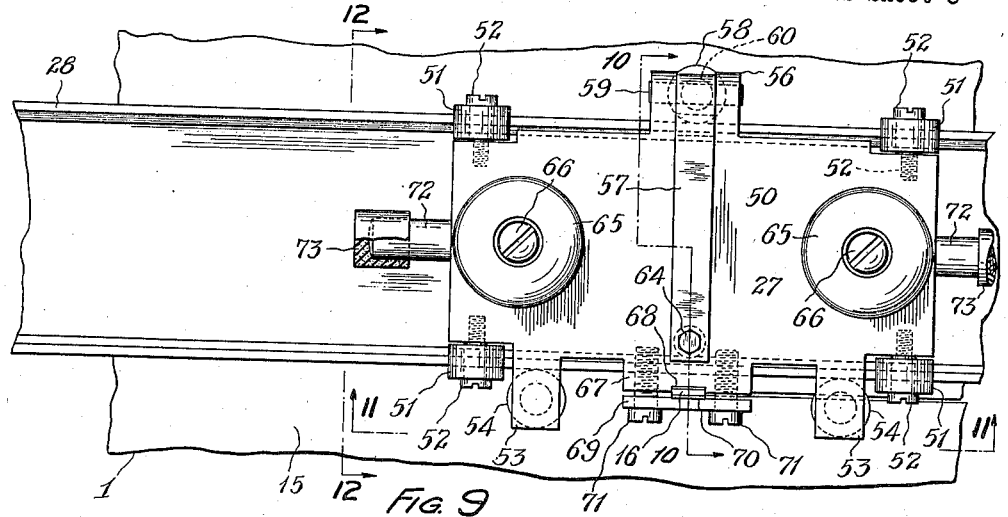
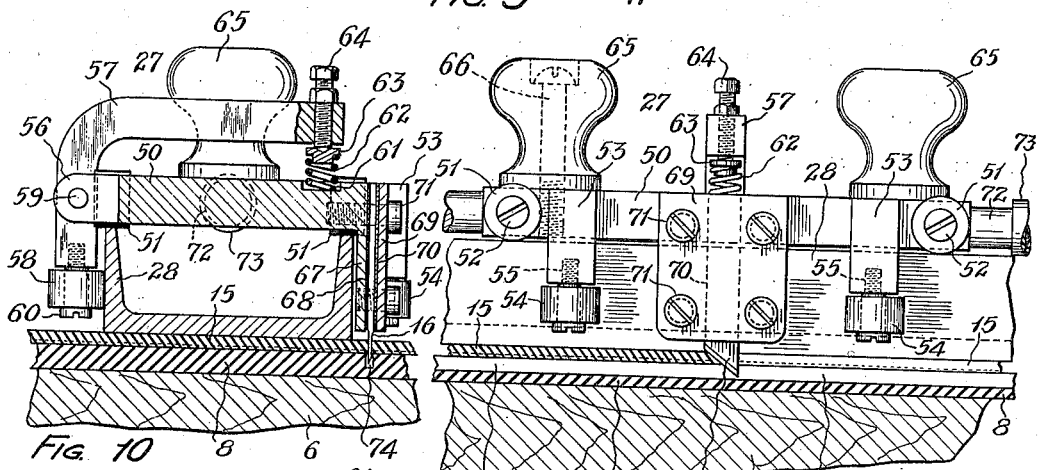
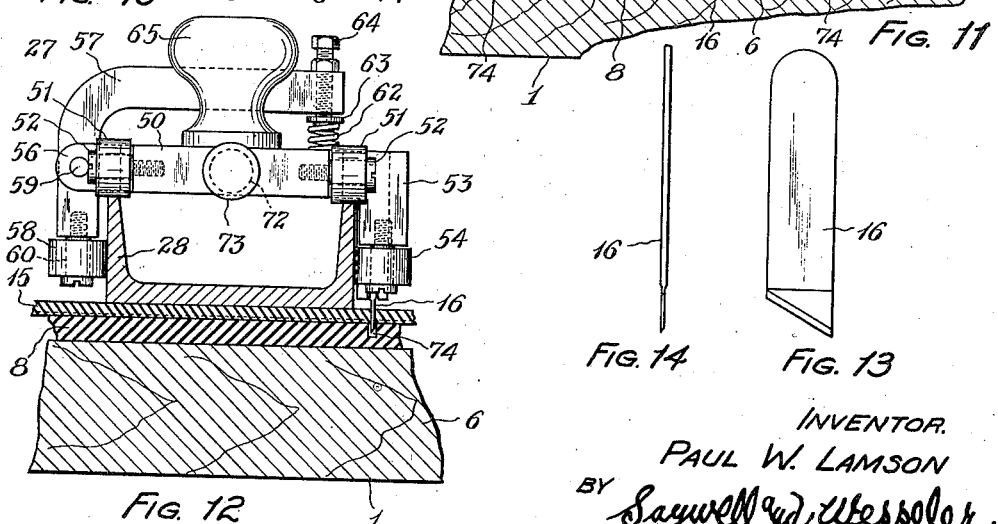
INVENTOR.
PAUL W. LAMSON
BY Saywell and Wesseler
ATTORNEYS.

Dec. 22, 1936.                P. W. LAMSON                2,065,380
       MACHINE FOR CUTTING SHEETS OF RUBBER, LINOLEUM AND THE LIKE
                        Filed Jan. 7, 1936          5 Sheets-Sheet 4
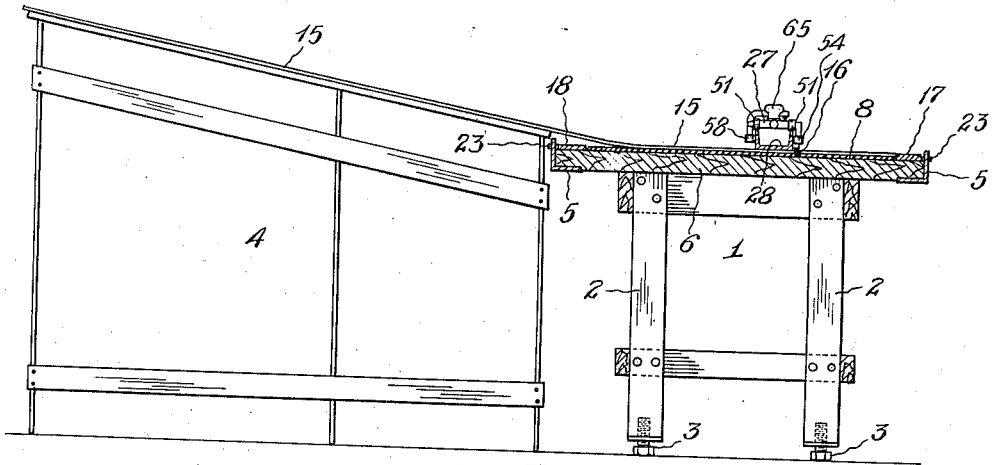
Fig. 15
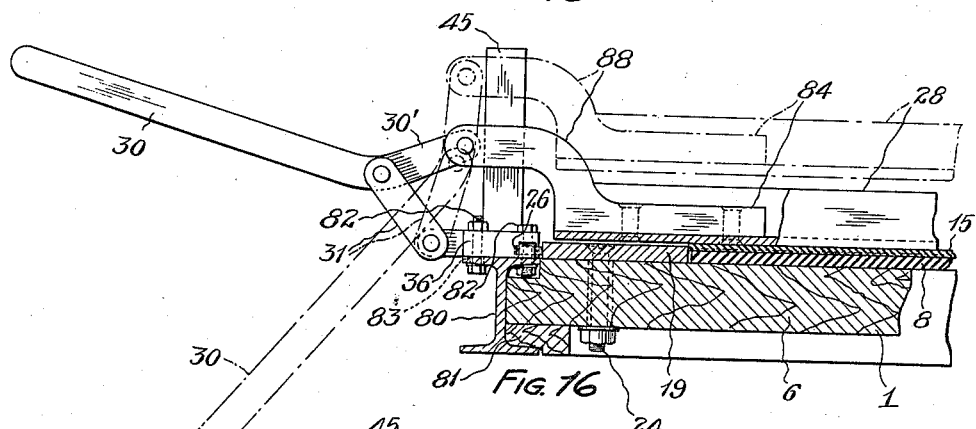
Fig. 16
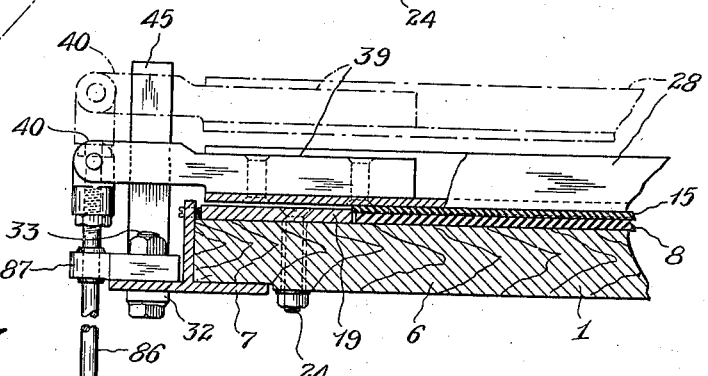
Fig. 17
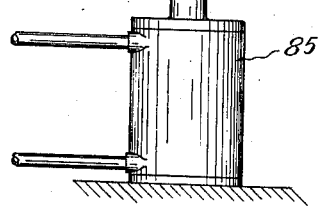
INVENTOR.
PAUL W. LAMSON
BY Saywell and Wesseler
ATTORNEYS.

Dec. 22, 1936.  P. W. LAMSON  2,065,380
MACHINE FOR CUTTING SHEETS OF RUBBER, LINOLEUM AND THE LIKE
Filed Jan. 7, 1936   5 Sheets-Sheet 5
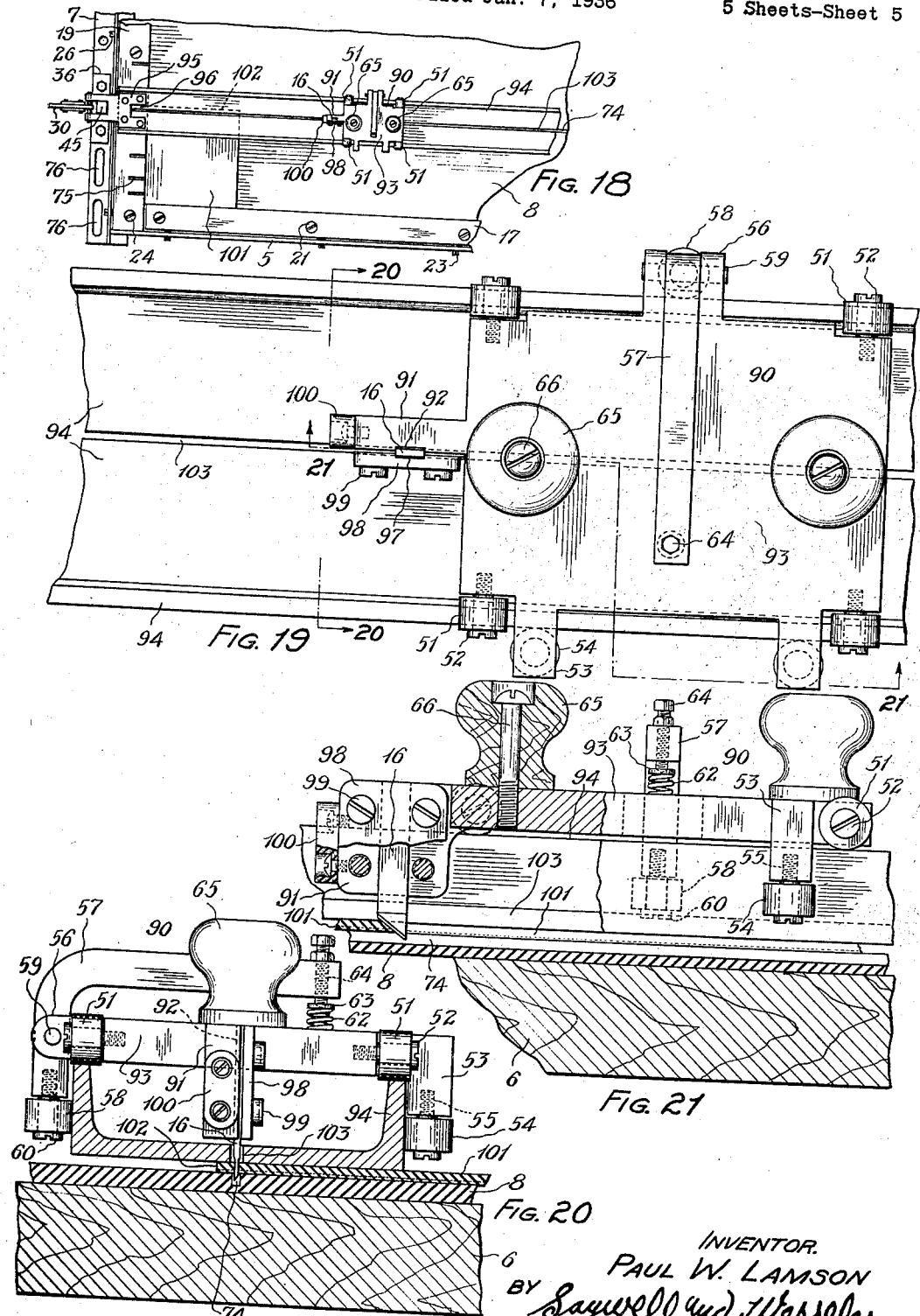
INVENTOR.
PAUL W. LAMSON
BY Saywell and Wesseler
ATTORNEYS.

Patented Dec. 22, 1936

2,065,380

UNITED STATES PATENT OFFICE 2,065,380

MACHINE FOR CUTTING SHEETS OF RUBBER, LINOLEUM, AND THE LIKE

Paul W. Lamson, Cleveland Heights, Ohio

Application January 7, 1936, Serial No. 57,976

6 Claims. (Cl. 164—73)

My invention relates to improvements in cutting machines and an embodiment thereof for use in cutting rubber sheets into tile is described and shown in the accompanying description and the annexed drawings. Particularly, the machine shown and described is used for cutting rubber sheets into floor tile. The invention is also adaptable for use in cutting linoleum and other like products.

The objectives of the invention are to provide a machine which will cut rubber sheets, linoleum, and like products, into sections, which are dependably uniform throughout each dimension, and which have smooth plane edges so as to permit the formation therefrom of a flooring with substantially perfect joints between adjacent units of which the floor is comprised; which will enable the cutting to be done economically and at a high production rate; a machine which is made at a low cost and is operated conveniently; and which effects these results with a minimum waste of the sheet material from which the floor sections are cut. The invention includes operating upon the rubber sheets, linoleum, and like products, with a knife-like cutting action.

The annexed drawings and the following description set forth in detail certain mechanism embodying my invention, the same covering, however, only a few of the various forms in which the principle of my improved machine may be embodied.

In said annexed drawings:

Figure 1 is a plan view of a machine for cutting rubber sheets into individual tile, this machine illustrating one form of my improved cutting machine. I suggest in the figure a working table upon which the operations may be effected. In this figure a rubber strip from which a plurality of individual tile may be cut is shown in working position upon the table, and various positions and means to and by which, respectively, rubber sheet sections may be set for cutting into strips of various widths, and strips may be set for cutting into tile of various sizes, are suggested;

Figure 2 is a plan view, upon an enlarged scale, of a fragmentary portion of the elements shown in the lower left hand corner of Figure 1;

Figure 3 is a fragmentary transverse vertical section, taken in the plane indicated by the line 3—3, Figure 2;

Figure 4 is a fragmentary vertical longitudinal section, upon an enlarged scale, taken in the plane indicated by the line 4—4, Figure 1;

Figure 5 is a side elevation of the assembly shown in Figure 1;

Figure 6 is a fragmentary longitudinal vertical section, upon an enlarged scale, taken in the plane indicated by the line 6—6, Figures 1 and 8;

Figure 7 is a plan view of the elements shown in Figure 6;

Figure 8 is a left end elevation of the elements shown in Figures 6 and 7;

Figure 9 is a plan view, upon an enlarged scale, of certain cutter-carriage mechanism with a fragmentary showing of certain elements adjacent thereto;

Figure 10 is a transverse vertical section, taken in the planes indicated by the line 10—10, Figure 9;

Figure 11 is a longitudinal vertical section, taken in the plane indicated by the line 11—11, Figure 9;

Figure 12 is a transverse vertical section, taken in the plane indicated by the line 12—12, Figure 9;

Figures 13 and 14 are an elevation and an edge view, respectively, of a cutter element, which is mounted in and carried by the carrier mechanism shown in Figures 9, 10, 11, and 12;

Figure 15 is a left hand elevation, partially in section, of the elements shown in Figure 1, the view being taken from the planes indicated by the line 15—15, Figure 1;

Figure 16 is a view similar to Figure 6 but showing a modified construction of the working table and a consequent modified connection thereto of certain means for securely holding the rubber sheet sections and strips while being cut;

Figure 17 is a view similar to Figure 6 but showing the use of a hydraulic cylinder for clamping and releasing certain holding means for the rubber sheet sections and strips, in lieu of the manually-operated clamping and releasing means shown in Figure 6;

Figure 18 is a fragmentary plan view of a modified form of my improved cutting machine as assembled for the use of the rubber cutter when the latter is mounted substantially centrally of one end of the cutter-carriage, instead of being mounted substantially centrally of one side of the carriage, the latter form of mounting being shown in Figure 9, for instance;

Figure 19 is a fragmentary plan view, upon an enlarged scale, of the cutter and cutter-carriage and some elements adjacent thereto shown in Figure 18;

Figure 20 is a transverse vertical section, taken in the plane indicated by the line 20—20, Figure 19; and Figure 21 is a fragmentary vertical longitudinal section, taken in the planes indicated by the line 21—21, Figure 19.

Referring to the annexed drawings in which the same parts are indicated by the same respective numbers in the several views, I show, when using my invention in an embodiment suitable for cutting rubber sheets into tile, a table 1, Figure 5, providing, by means hereinafter fully described, a substantially level working surface, and having an auxiliary side table portion 4, Figure 15, whose top surface at its outer edge is substantially higher than the working surface of the table 1 but which is inclined downwardly toward the latter surface so as to flow into the latter at about the level of the top surface of the table 1. The table members 1 and 4 are provided with suitable supporting legs 2 having height-adjustment and leveling means 3. The table 1 is, generally, of frame construction having a wood top 6 but is provided with side angles 5, Figure 3, and inverted end T's 7, Figure 6, which protect and reinforce the top 6 and which are welded together at their ends with the angles 5 resting upon the inner flanges of the invented T's 7.

In general, the method of cutting rubber sheets into individual tile upon a working surface, such as described, and by the use of suitable cutting means and means for operating the latter, together with means for tile size variation, all of which means will be herein fully described in detail, is substantially as follows: The tile material is received in rolled rubber sheets consisting of, for instance, about a 92-foot length of, for instance, 38-inch width material, of a thickness suitable for the desired individual tile into which the sheet is to be cut. Assuming that one dimension of the desired individual tile is 12 inches, then the 38-inch width original sheet will provide material for three strips cut lengthwise of the sheet with a 2-inch surplus for trimming purposes. However, the substantially 92-foot length sheet preferably is first cut into short sections which are 38 inches wide; for instance, ten sections, each of a length slightly more than 9 feet. Assuming that the sections which are cut from the 92-foot length sheet are substantially 9 feet 1 inch in length, and assuming that both dimensions of the final desired individual tile are 12 inches, then ten sections can be cut from the 92-foot sheet, with a surplus in the sheet to permit end trimming thereof without substantial waste, and the slightly more than 9-foot length strips into three of which strips each section is to be subdivided can each be cut into nine individual tile with some surplus for strip end trimming but without substantial waste. A series of operations for effecting the cutting, such series of operations being mentioned in sequence, is as follows: The substantially 92-foot sheet roll is gradually unrolled and slightly more than 9-foot sections cut therefrom as it is unrolled. The sections are each 38 inches wide and the severance of the same from the roll can be indifferently effected, as regards the exact length of the same, except that they are each slightly more than 9 feet long. There will be obtained from the 92-foot roll ten such 38-inch width sections with some slight wastage at the end of the roll. These 38-inch width and slightly more than 9-foot length sections are cut by my improved cutting machine into lengthwise strips of desired width, and I suggest in Figure 1, by dot and dash lines on the table 1, means 29 for varying the width of the strips, but for purpose of illustration I shall assume at this point in the description that the 38-inch width and slightly more than 9-foot length sections are to be cut into three strips each 12 inches wide and each slightly more than 9 feet long. The means for cutting strips of varying widths will be described later. The division of the rubber sections into strips is effected by placing a section at a time lengthwise upon the table 1 and trimming one edge of the section lengthwise of the latter, by the travel lengthwise of the table 1 of cutting mechanism hereinafter described in detail, so as to obtain the smooth plane uniform formation upon that edge of the section which is desired in the final resultant tile. Then by the use of suitable gauges, the gauges being hereinafter fully described, the rubber section with its one trimmed edge is cut lengthwise 12 inches within said trimmed edge, to form a strip slightly more than 9 feet long and exactly 12 inches in width throughout its length and having both edges smooth and plane and uniform and as desired for the final individual tile. Another corresponding strip is cut lengthwise from the balance of the section, this second strip having a length slightly in excess of 9 feet and a uniform width of 12 inches throughout its length and having uniform edges suitable for the final individual tile. There remains a third strip which is slightly less than 14 inches in width and is of a length slightly in excess of 9 feet, and this strip is gauged so as to permit the cutting therefrom of a strip exactly 12 inches in width throughout its length and slightly in excess of 9 feet long. Thus, there has been obtained three strips each uniformly 12 inches wide throughout their length and each slightly in excess of 9 feet long, and each having the plane uniform smooth edges desired for the final individual tile, the wastage from each section being a total of 2 inches obtained from the initial edge trimming of the section and that wastage which remained from the cutting of the final strip.

These strips slightly more than 9 feet in length, which are exactly 12 inches wide throughout their lengths and each of which have true trimmed edges and untrimmed ends, are now to be cut into final tile 12 inches square and the ends of which are to have uniform smooth edges similar to those which have been provided for on the tile sides when cutting the sections into strips as has been described. This division of the strips into individual tile is effected with the strips positioned transversely of the table 1, Figures 1 and 15, and one such strip 15 in position for being cut into individual tile is shown in these figures. Before the strip 15 was moved into position so as to cause its end to contact a side gauge 17, Figure 1, it was positioned so that said end slightly projected beyond the path of travel of a cutter 16, one lengthwise edge of the strip being engaged by an end gauge 19, and the end of the strip was trimmed so as to provide the desired uniform edge upon said strip end. Then the strip was moved to the right, Figure 15, until its trimmed and desired end surface engaged the side gauge 17, a lengthwise edge of the strip being held in engagement with the end gauge 19, and the cutter 16 operated to sever a 12-inch length from the strip and thus to form the desired individual tile 12 inches square. This severance of the individual tile from the strip results in forming the desired uniform smooth edge upon the other end of the tile. Successive movements of the strip 15 to the right, Fig. 15, and the proper gauging by the gauges 17 and 19, permits successive severance of individual tile each 12 inches square and each having its four edges plane and smooth and uniform.

The above is a general outline of the operations. The detail of the operating mechanism, including the means for gauging, and for insuring plane uniform smooth tile edges, will now be described.

Upon the top of the table 1, whose working surface is shown in the accompanying drawings, for purpose of illustration, as lying in a horizontal plane, I provide a rubber pad 8 which forms a resilient working surface, and also provide material into which the cutter will penetrate and through which it will travel when cutting the strips and tile, without injuriously affecting the operation of the cutter. The gauges which in general terms have been heretofore mentioned are four in number secured to the top of the table 1, two of which 17 and 18 are secured adjacent the sides of the table 1 and two of which are end gauges 19 and 20, these gauges being secured by bolts 21 mounted in enlarged holes formed in the wood base 6 and the angles 5 and T's 7. The bolts 21 for the side gauges 17 and 18 are secured to the horizontal flanges of the angles 5, being adjustable relatively to the table 1 by means of enlarged holes 22 and 22' formed in the table 1 and angles 5, respectively, and the bolts 24 for the end gauges 19 and 20 are secured to the exterior flanges of the T's 7, being adjustable relatively to the table 1 by means of enlarged holes 25 formed in the table 1. The rubber pad 8 is disposed within the space formed by the inner edges of the gauges 17, 18, 19 and 20, and is somewhat less in thickness than said gauges so that the rubber sections or rubber strips or individual tile can engage said gauges by their edges, as will be clear from Figure 3. By reason of the enlarged holes 22, 22', and 25, 25', the gauges can be adjusted somewhat inwardly and outwardly of the table 1, the angles 5 and T beams 7, the gauges 17 and 18 being held to their adjusted positions by screws 23 which intersect the angles 5 and bear against the outer edges of the gauges 17 and 18, and by means of screws 26 which intersect the stem of the inverted T's 7 and bear against the outer edge of the gauges 19 and 20. The screws 23 and 26 also serve to move the gauges 17, 18, 19, and 20 inwardly for the actual adjusting operations, if the adjustments needed are such as to require an inward movement of the gauges. These adjustments of the gauges are only comparatively slight in extent and are intended to care for warpage, wear on the cutting knife, and other contingencies, which would require slight adjustments of the gauges relative to the table 1 and rubber pad 8 in order to secure the exact cutting effect necessary to produce a uniform cut or severed strip or tile of the desired dimensions. In additon to providing suitable material which the rubber-cutter will penetrate, the rubber base pad 8 absorbs any irregularities in the rubber sheet material, when the sheet sections or strips are clamped for the cutting operation hereinafter fully described.

It is evident that the structure so far described provides for positioning the rubber sheet sections and the strips 15 upon a working rubber base against end and side gauges by the use of which and a suitable straight edge tool the sections and strips can be cut and trimmed, and the individual tiles trimmed, as desired. For supplementing the gauges, if strip widths are desired which are not obtainable by any particular setting of the cutting mechanism, standard gauge fillers 29 are provided, for such decreases as are desired in the width of strips, or even such increases as are desired up to 18" width, when handling 36" to 38" rubber sections.

The cutter 16 is adapted to travel lengthwise of the table 1 on a movable carriage 27 and is adjustable transversely of the table 1, by reason of the transverse adjustability of a channel clamp 28 upon which the carriage 27 travels, which clamp is vertically movable and of sufficient weight so as further to serve the purpose of tightly holding the section or strip to the resilient base 8 when the cutting is being effected. The means for adjusting this clamp 28 transversely will be hereinafter fully described but it will suffice for the moment to indicate that such means serve to vary the width of the strips into which the rubber sheet sections can be cut and the lengths of individual tile, into which the strip 15, Figure 1, can be cut, some such variations being indicated by the figures "1½'"", "3'"", "6'"", etc., at the right hand end of Figure 1, these particular figures indicating the amount of material cut when the respective figure positions lie in the axis of the transversely adjustable clamp 28.

The design of the clamp 28 is clearly indicated in Figures 1, 10, and 12, for instance, and to effect the rubber section and strip holding and releasing positions of the clamp 28, it is adapted to be lifted and lowered relatively to the rubber pad 8 by manually operable end handles 30. These handles 30 which extend outwardly from the ends of the table 1 are each formed with angular end portions 30', to the inner ends of each of which, and pivoted upon pins 41, are secured one end of each of a pair of toggle links 31 whose other ends are pivoted upon pins 42 to an ear 38 formed upon a plate 36. The latter is mounted upon the outer flange of the inverted end T's 7, the securing of the plate 36 to the T's 7 being effected by studs 33 formed integrally with a plate 32 which engages the lower surface of the outer flange of the end T's 7, these studs passing through enlarged holes 35 in the T's 7 and holes 37 in the plate 36 and being secured in their adjusted position in the enlarged holes 35 by means of nuts 34. The outer ends of the angular end portions 30' of the handles 30 are pivoted upon pins 43 between spaced ears 40 formed upon and outwardly extended from a plate 39 which is secured by rivets 44 to the inside face of the base of the channel clamp 28. The plate 36 is formed with an upstanding standard 45 upon three sides of which the outer end of the plate 39 and the opposed inner surfaces of the ears 40 are adapted respectively to slide, this post 45 forming a guide for the up and down movements of the plate 39. When the handle 30 is moved from the position shown in full lines, Figure 6, to the position shown by the dot and dash lines, the described linkage effects the vertically-aligned lifting of the plate 39, and hence channel clamp 28, to the position shown in dot and dash lines, Figure 6, inasmuch as the ear 38 and pin 42 are fixed and the post 45 forms a guide for vertical movement of the plate 39. The dot and dash line showing in Figure 6 is that when the channel clamp 28 is lifted, and hence when a rubber section or strip can be positioned on or removed from the rubber base 8, and the full line showing in Figure 6 is that when the clamp 28 rests upon the rubber section or strip so as to hold the latter secure during the cutting operation. Inasmuch as the toggle action is such as to push the pin 41 beyond center, in the fully uplifted position of the clamp 28, the latter will be locked in its lifted position without necessitating the positive holding of the same uplifted.

The carriage 27 for the cutter 16 comprises a plate 50 which travels upon the upper edges of the two flanges of the channel clamp 28 by means of two pairs of rollers 51 which are mounted by bolts 52 in the sides of the plate 50, said plate 50 having a laterally-extended pair of depending extensions 53 in the bottom faces of which are mounted by bolts 55 a pair of rollers 54 which bear against the outside face of one of the flanges of the channel clamp 28. Outwardly extended from the central part of the opposite side of the plate 50 is an ear 56 within which is secured a pin 59 upon which is pivotally mounted an angular arm 57 extended at one end downwardly and substantially parallel to the outside face of the adjacent flange of the channel clamp 28 and whose other end is extended transversely across the top of the plate 50 and spaced somewhat above the latter. Secured to the lower end of the depending part of the arm 57 by a screw 60 is a roller 58 which bears against the outside face of the adjacent flange of the channel clamp 28. The degree of pressure with which the roller 58 engages the outside face of the clamp flange is controlled by the tension of a spring 62, one end of which is set in a recess 61 formed in the top face of the plate 50 vertically adjacent the end of the horizontal transverse portion of the arm 57, the other end of the spring 62 bearing against a block 63 positioned beneath the bottom face of the end of the arm 57 and engaged by a bolt 64 which has a screw-threaded engagement with the arm 57. It is evident, therefore, that by means of the rollers 51 the cutter carriage 27 can travel back and forth upon the flanges of the channel clamp 28 and can be held in alignment on said clamp 28 and with the desired tension by means of the side rollers 54 and 58 and the spring 62. The carriage 27 is manually moved on its rollers by means of knobs 65 which are secured to the top of the plate 50 by screws 66.

From one side of the plate 50 and intermediate the pair of rollers 54 depends a flange 67 which is formed in its outside face with a vertical recess 68. This recess 68 is opposed to a complementary recess 70 formed in a removable plate 69 which is spaced outwardly of the flange 67 and is secured to the flange 67 by screws 71. The vertical chamber formed by the recesses 68 and 70 accommodates the cutter 16 which can be mounted and removed and adjusted through the medium of the removable plate 69. In order to prevent the plate 50 from contacting a guide post 45, when the carriage 67 is moved to its extreme right hand or left hand position, Figure 1, I provide the ends of the carriage 27 with outwardly-extended bumper rods 72 secured to the plate 50 whose ends are provided with cushioned bumpers 73 which contact the posts 45.

When shifting the rubber strip 15 from left to right, Figure 15, I make use of a guide 46, Figure 4, fastened by screws 47 to the gauge 19 and having an inwardly extended portion somewhat vertically spaced from the rubber base 8, and serviceable for preventing the left hand edge of the strip 15, Figure 1, from climbing upon or being pushed upon the top of the guide 19, and thereby being misplaced from what should be its proper gauged position against the inner edge of the gauge 19.

The cutter 16 is a knife, Figures 13 and 14, one desirable design of which is shown in said Figures 13 and 14. The path of travel of the carriage 27 is in a plane parallel to the working surface of the table 1 so that, when the cutter 16 is adjusted to the desired position in the vertical chamber formed by the recesses 68 and 70 and securely fastened in such position, every portion of the cutting edge of the cutter 16, throughout the whole effective movement of the carriage 27, is moved against and through the respectively opposed portions of the rubber sheet perpendicularly to the horizontal plane of the sheet. This knife 16 severs the rubber sheet sections and strips with a clean cutting action, as distinguished from a shearing action, so that no rough or uneven rubber edges result. Particularly, this clean cutting action is advantageous when longitudinally trimming a rubber sheet section near an edge thereof or trimming a strip near an end thereof, inasmuch as any buckling or disarrangement of the small body of rubber material outside of the proposed cut, which is an ever present danger in a shearing action, is obviated. By reason of the knife-cutting action, and the means for effecting the same which have been described, I secure plane uniform edges in the final individual tile with a certainty and uniformity of tile dimensions substantially perfect within any practicable and desirable limits.

The cutting action upon the sheet rubber sections or strip 15 will result in cutting a groove 74 in the underlying rubber base pad 8. If desired, this groove 74 can be preliminarily formed in said pad 8. Such grooves 74 are formed in the pad in whatever plane thereof there is any occasion to pass the knife 16. As has been stated, the channel clamp 28 and knife carriage 27 mounted thereon are adjustable transversely of the table 1 for cutting such width sheet sections and such length individual tile as are desired, so that there will be formed in any extensive and varied use of the cutting machine a great number of grooves 74 in the underlying base pad 8. Grooves 75 are also formed in the end gauges 19 and 20, in such places and at such spacing as is desirable, to provide spaces into which the knife cutter 16 may pass at the extreme ends of the cutting strokes.

The outer flanges of the inverted T's 7 are formed with a series of equally spaced enlarged holes 35 and adjacent one end with a plurality of elongated slots 76 in axial alignment with the centers of the holes 35, so that the clamping mechanism can be transversely adjusted with the carriage 27 and cutter 16 to cut any desired width strip or any desired length tile.

In Figure 16, I show a modification in the frame of the machine in that I-beams 80 are utilized in lieu of the side angles 5 and end inverted T's 7 shown in the preceding figures. The wood base 6 is mounted in level horizontal position upon the upper face of the lower inner flange of the I-beams 80 by means of wood blocks 81, and the plates 36 are adjustably mounted upon both upper flanges of the end I-beams 80 by means of bolts 82 passing through enlarged holes 83 formed in the upper flanges of the end I-beams 80. In this construction the ears 88 of the plate 84 are bent angularly upwardly in order to compensate for the greater height at which the plate 36 is mounted in the form of construction shown in Figure 16 than it is mounted in the form of construction shown in Figure 6.

In Figure 17, I show a hydraulic cylinder 85 actuated in any suitable and desired manner for lifting and lowering the channel clamp 28, in lieu of the manually-actuated handles 30 and toggle link construction shown in Figure 7. Cylinder piston rod 86 is slidably mounted within a boss 87 depending from the pin 43.

In Figures 18–21, I show a form of knife carriage 90 modified to the extent necessary to provide for a substantially central mounting of the cutter 16 at one end of the carriage rather than a substantially central side mounting of the cutter such as is shown in Figure 9. I dispense with the flange member 67 upon the plate 50 and the removable and adjustable plate 69 of Figure 9 and form a substantially central end extension 91 upon the carriage 90 having a recess 92 in one face thereof which is opposed to recess 97 formed in one face of a removable and adjustable plate 98 which is secured to the extension 91 by bolts 99, the assembly forming, similar to the assembly of Figure 9, means for mounting and removing and adjusting the cutter 16, and holding the same securely during the cutting action. In this form of construction the cutter carriage 93 is made wider than the carriage 27 of Figure 9 and the channel clamp 94 is of heavier construction than the channel clamp 28. Also, there is some modification in the machine structure adjacent its ends in that a shorter plate 95 is used than the plate 39, Figure 7, this plate 95 also being wider than the plate 39 and being formed with a central slot 96 intersecting its inner face, into which slot the cutter 16 may move at the end of the cutting stroke. This is necessitated by reason of the fact that in the form of construction shown in Figures 18–21, the knife is mounted centrally of the width of the traveling knife carriage 93 and not laterally of the traveling carriage as is true of the form of construction shown in Figure 7. The front face of the extension 91 is provided with a cushioning surface 100 for absorbing the shock of the contact of the extension 91 with the guide post 45 at the end of the cutting stroke. When the cutter 16 is mounted centrally of the width of the carriage 93, the latter can be reversed end to end on the channel clamp 94 to change from a right hand cutting operation to left hand operation. A slot 103 is formed in the base of the channel clamp 94 in which the cutter 16 travels, when using the form of knife carriage 90 shown in Figures 18–21.

An important advantage of mounting the cutter 16 centrally of the width of the carriage 93 is that thereby it is possible to clamp the rubber piece which is being trimmed from the rubber section or rubber strip. This is particularly important when an unusually narrow piece is being trimmed off which might buckle during the trimming operation if the material were not clamped upon both sides of the cutter 16. Such clamping of a piece being trimmed is clearly shown in Figure 20 wherein a piece 102 is being trimmed from the tile 101. This operation is also clearly shown in Figure 18.

My improved cutting machine lends itself to rapid and convenient section and strip cutting by two operators. When cutting sections into strips each operator will attend to the lifting and lowering of the channel clamp 28 by manipulating one of the actuating handles 30 at the ends of the machine. The two operators can be stationed upon the near side of the machine, Figure 1, and respectively adjacent the two ends thereof and by reaching over the channel clamp 28 can slide the rubber section toward the side gauge 17 so as to cause the near side of the section tightly to contact the inside face of the gauge 17, and the operator adjacent the right hand end of the machine, Figure 1, can push the rubber section to the left, Figure 1, so as to cause the left hand end of the section closely to contact with the inside face of the end gauge 19, and then the right hand operator can push the carriage 27 from right to left, thus causing the cutter 16 to sever a strip from the section. Thus, two operators can rapidly and conveniently effect the cutting of the rubber sections into strips and any desired balancing of work or effort required of the respective operators can be effected by the operators periodically changing their working positions.

When cutting a strip into individual tiles, one operator stationed at the left hand end of the machine, Figure 1, can manipulate the adjacent handle 30 with one hand and shift the strip 15, Figure 15, to the right after severance of each individual tile and cause the end of the strip tightly to contact the inside face of the gauge 17, and the other operator stationed adjacent the left hand end of the near side of the machine, Figure 1, can hold the strip tightly against the end gauge 19 with one hand and operate the cutter 16 backwardly and forwardly through its tile-severing stroke with the other hand. Only one end of the channel clamp 28 is raised and lowered when cutting strips into tiles, it not being necessary to raise and lower the far end of the clamp 28 during this operation, the far end of the clamp being left in lowered or clamping position. During the cutting of strips into tiles, however, a shim or filler of the same thickness as the sheet rubber material may be placed under the far end of the clamp 28 so as to fix said end at a height identical with the height of the manipulated end of the clamp when said latter end is lowered into its clamping position.

What I claim is:
1. In a cutting machine for sheets of rubber, linoleum, and the like, a combination sheet clamping member and cutter mechanism comprising an extended channel member and a cutter carriage provided with rollers engaging the edges of the channel flanges, means for moving the carriage, resilient means for guiding the carriage and retaining said rollers in contact with said flanges, and a cutter adjustably mounted on the carriage.

2. In a cutting machine for sheets of rubber, linoleum, and the like, a sheet clamping member comprising spaced supports, a movable clamping member extended between said supports and having end guiding surfaces, plates secured to said supports and formed with outwardly extended guide posts adapted to be engaged by said guiding surfaces, actuating handles pivotally secured to the clamping member adjacent the ends thereof, and toggle links pivotally secured to the respective handles and to the respective plates.

3. A cutting machine for sheets of rubber, linoleum, and the like comprising a table having a working surface, means forming an enclosed sheet-receiving recess above the table surface, a rubber sheet-supporting pad mounted on the working surface and in the recess and having substantially the same linear dimensions as the recess, said pad having a continuous plane upper surface, a clamping member having a continuous smooth clamping surface extended across the sheet-receiving recess, means for moving the clamping surface toward and from the sheet-supporting pad, a cutter carriage mounted for rolling travel on the clamping member parallel to the upper surface of the pad, means for moving the carriage, and a cutter mounted in the carriage and having a knife-like cutting edge, the cutter being mounted so that its cutting edge, during the movement of the carriage, cuts through a sheet mounted in the sheet-receiving recess and extends below the upper surface of the pad.

4. A cutting machine for sheets of rubber, linoleum, and the like comprising a table having a working surface, guides adjustably supported by the table and forming a sheet-receiving recess above the working surface thereof, a rubber sheet-supporting member mounted on the working surface and in the recess and having slightly less linear dimensions than the recess and being of less thickness than the depth of the recess, the table having a secondary working surface angularly disposed relative to the first-mentioned working surface, the second-mentioned working surface merging with a portion of the first-mentioned working surface, an additional guide for insuring the feeding of rubber strips in proper position relative to the guides forming the sheet-receiving recess when said strips are mounted for cutting into tile upon the second-mentioned working surface and said portion of the first-mentioned working surface, a clamping member having a continuous smooth clamping surface extended across the sheet-receiving recess, said clamping surface being also extended across said portion of the first-mentioned working surface, means for moving the clamping surface toward and from the sheet-supporting member, a cutter carriage mounted for travel on the clamping member, means for moving the carriage, and a cutter mounted in the carriage so as to cause its cutting edge, when the carriage is moved, to intersect and move through the rubber sheet-supporting member and a rubber sheet mounted in the recess on said member.

5. A cutting machine for sheets of rubber, linoleum, and the like comprising a sheet-supporting table, a reciprocatory sheet-clamping member extended across and spaced from the table top, toggle links connecting the sheet-clamping member at its two ends to the table, means for actuating the links to move the clamping member toward and from the table top, a cutter carriage mounted for rolling travel on the clamping member, resilient means for controlling the alignment of the carriage on the clamping member, means for moving the carriage, and a cutter supported by the carriage and adjustable toward and from the table top.

6. A cutting machine for sheets of rubber, linoleum, and the like comprising a work table, a rubber sheet-supporting member mounted on the table and covering substantially the entire working surface thereof, means forming a sheet-receiving recess above said member, a clamping member having a continuous smooth clamping surface extended across the sheet-receiving recess, means for moving the clamping surface toward and from the sheet-supporting member, a cutter carriage having rollers engaging the clamping member for travel of the carriage on the latter, other rollers on the carriage and engaging the clamping member for guiding and aligning the carriage travel, resilient means controlling the engagement of the rollers with the clamping member, means for moving the carriage, and a cutter supported by the carriage and adjustable toward and from the sheet-supporting member.

PAUL W. LAMSON.